March 16, 1965 A. F. CAKE 3,174,115
SEMICONDUCTOR ASTABLE MULTIVIBRATOR
Filed Sept. 18, 1961
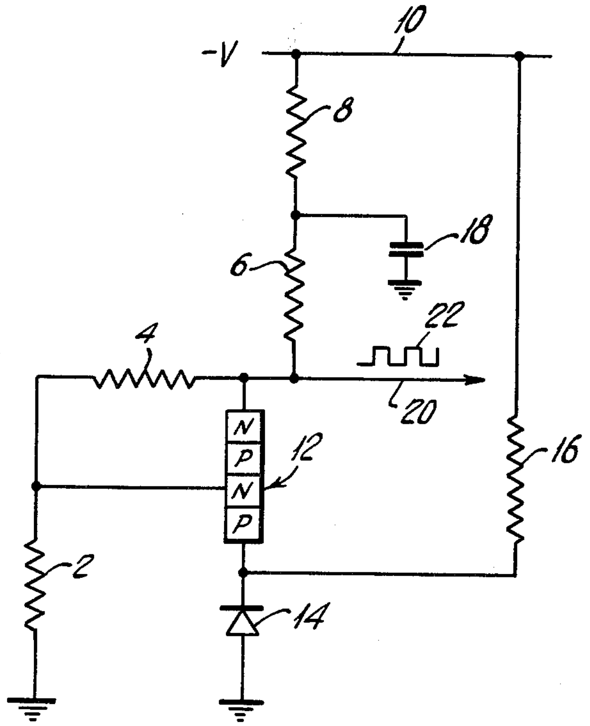
INVENTOR
ARTHUR F. CAKE
BY
Eyre, Mann & Lucas
ATTORNEYS 3,174,115

SEMICONDUCTOR ASTABLE MULTIVIBRATOR

Arthur F. Cake, Orange, N.J., assignor to Tung-Sol Electric Inc., a corporation of Delaware Filed Sept. 18, 1961, Ser. No. 138,981
4 Claims. (Cl. 331—111)

The present invention relates to oscillatory circuits and comprises a novel astable multivibrator circuit that incorporates a minimum number of components, oscillates at a relatively high frequency and produces a square wave output. The circuit includes only a single gated four zone semiconductor, a diode, a capacitor, and a number of resistors. As an N-gated germanium four zone device such as a 2N1968 is particularly suited for use in the astable multivibrator circuit of the invention the circuit will be described with particular reference to such type of four zone device although either P or N-gated four zone devices could be employed whether of germanium or silicon.

The 2N1968 can be triggered to the conductive state by a negative pulse at its gate (the inner N zone) and turns off when the collector (the end N zone) current falls below a sustaining current value.

In the circuit of the invention the automatic and abrupt triggering of the device from "off" to "on" to "off" etc. results in a square wave voltage at the collector terminal. The resistors of the circuit are connected across a source of operating energy to serve as a voltage divider and to which the gate and collector of the four zone device are connected. The diode and an additional resistor are connected in series across the source with the junction thereof connected to the emitter (the end P zone) of the four zone device. The capacitor is connected to the potential divider to be charged when the four zone device is "off" and to discharge into the collector when the four zone device is "on."

For a better understanding of the invention and of a specific embodiment thereof reference may be had to the accompanying drawing of which the single figure is a diagram of an astable multivibrator circuit embodying the invention.

In the circuit of the diagram, four resistors 2, 4, 6 and 8 are connected in series between ground and a line 10 maintained at a suitable negative potential, —V. The four zone PNPN device, shown schematically at 12, has its gate connected to the junction of resistors 2 and 4, its collector connected to the junction of resistors 4 and 6 and its emitter connected to the cathode of a diode 14, the anode of which is grounded. A resistor 16 is connected between the emitter of device 12 and line 10. A capacitor 18 is connected between the junction of resistors 6 and 8 and ground.

With the above described circuit, when the power is first turned on, the device 12 will be off and capacitor 18 will begin to charge to a potential determined by the respective magnitudes of the resistors 2, 4, 6 and 8. The potential at the emitter of the device 12 will be determined by the drop across diode 14 occasioned by the current through resistor 16. During charging of the capacitor 18 and build up of current through the potential divider the potentials of the gate and collector of the device 12 increase negatively. When the potential of the gate becomes more negative than that of the emitter, a current in the turn-on direction flows from the emitter to the gate and when the magnitude of this current is sufficient the device conducts. The potential at the collector thereupon approaches ground and capacitor 18 discharges through resistor 6. The negative potential of the gate of device 12 thereupon drops to a low value permitting the device to turn off if the current through resistors 6 and 8 is less than the sustaining current of the device. When the device turns off the process repeats, yielding square wave voltage pulses at a terminal 20 connected to the collector. The pulses are indicated diagrammatically at 22.

In order for the circuit to operate as above described the relative values of the components must be selected with reference to the sustaining current of the particular four zone semiconductor device. For a 2N1968 suitable values for the components of the circuit are as follows:

| | |
|---|---|
| Resistor 2 | 1K. |
| Resistor 4 | 4.7K. |
| Resistor 6 | 330 ohms. |
| Resistor 8 | 3K. |
| Resistor 16 | 1K. |
| Capacitor 18 | .001 microfarad. |
| Diode 14 | 1N695. |
| —V | 12 volts. |

The frequency of oscillation of a circuit in which the components have the specific values given above is about 100 kc.

The invention has now been described with reference to a single embodiment thereof wherein the gated four-zone device is N-gated and of germanium. Any other N-gated four zone device, whether of germanium or silicon could be employed in the illustrated circuit. If a P-gated silicon controlled rectifier is employed in place of an N-gated device, no change in the circuit, other than a reversal of the polarity of the source and of the diode terminals, is necessary.

The following is claimed:

1. An astable multivibrator comprising a four zone semiconductor device of the type having emitter, gate and collector terminals that is rendered conductive when current between emitter and gate terminals is of sufficient magnitude and is rendered non-conductive when the current between the emitter and collector is below a predetermined value, a source of operating energy, a potential divider connected across said source, means for maintaining the potential of the emitter terminal at a value close to that of one terminal of the source, means connecting the gate of said four zone device to said divider at a point of potential further from that of said one terminal to provide current from emitter to gate terminals in the turn-on direction, a connection from the collector terminal to said divider at a point of potential nearer to that of the other terminal of said source than that at said gate terminal and a storage capacitor connected to a point on the divider of a potential nearer that of the other terminal of the source than the potential of the divider at the point to which the collector terminal is connected, whereby when said device is non-conducting said capacitor charges to a potential determined by its point of connection to the potential divider and when the emitter gate current becomes sufficient for turn-on of the device the current through the four zone device will be raised above said predetermined value during discharge of said capacitor through the points of said divider connected to the capacitor and the collector terminal and will be reduced below such value after discharge of said capacitor, said means for maintaining the potential of the emitter terminal close to that of said one terminal of the source comprising a diode and a rectifier connected across the source with the junction of said diode and rectifier connected to said emitter terminal.

2. The astable circuit according to claim 1 wherein said four zone device is N-gated, and said source of energy is a direct current source, said one terminal of the source being the positive terminal.

3. An astable multivibrator circuit comprising in combination a four zone semiconductor device having emitter, gate and collector terminals, a source of direct current operating energy, a potential divider connected across said source, a diode and a limiting resistor connected across said source, a connection between the emitter terminal of said device and the junction of said diode and resistor, connections between the gate and collector terminals and points on said divider of different potential, and a capacitor connected between one terminal of said source and a point on said divider at a potential intermediate that of the other terminal of the source and that of the point to which the collector terminal is connected.

4. The astable multivibrator circuit according to claim 3 wherein said potential divider includes two resistors which are connected in series between the collector of said semiconductor device and one terminal of said source and the junction of said two resistors is connected to said capacitor, said capacitor discharging through one of said resistors to said collector when the device becomes conductive, the magnitudes of said two resistors being such that the current therethrough after discharge of said capacitor is less than the sustaining current of said device whereby said device turns off.

References Cited in the file of this patent

Applications and Circuit Design Notes, August 1959, Solid State Products, Inc., Bulletin D420-02-8-59, Article 5, page 12, Figure 14.

Dynaquad Article, April 20, 1961, Tung-Sol Electric Inc., T475, 10 pages.